March 15, 1960    K. M. LEGHORN ET AL    2,928,120
PROCESS AND APPARATUS FOR THE MANUFACTURE
OF HOLLOW ARTICLES
Filed Dec. 20, 1955      6 Sheets-Sheet 1

INVENTORS.
KENNETH M. LEGHORN
BY JACK B. MEISTER
AGENT

INVENTORS.
KENNETH M. LEGHORN
JACK B. MEISTER
BY
AGENT

March 15, 1960 K. M. LEGHORN ET AL 2,928,120
PROCESS AND APPARATUS FOR THE MANUFACTURE
OF HOLLOW ARTICLES
Filed Dec. 20, 1955 6 Sheets-Sheet 3

INVENTORS.
KENNETH M. LEGHORN
JACK B. MEISTER

BY

AGENT

INVENTORS.
KENNETH M. LEGHORN
BY JACK B. MEISTER

AGENT

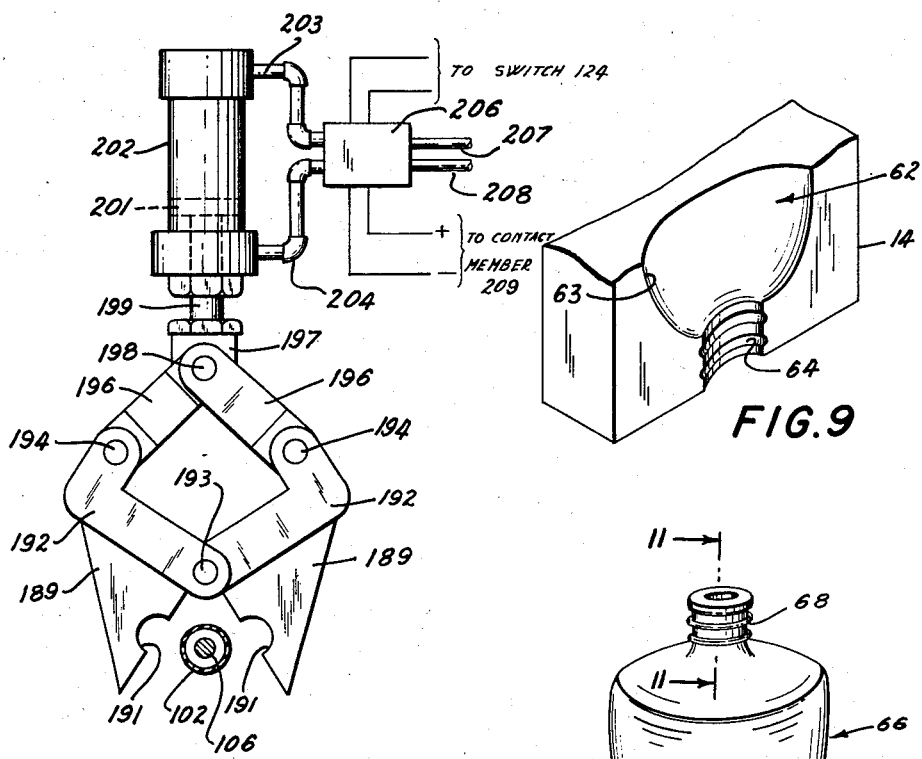
FIG.6
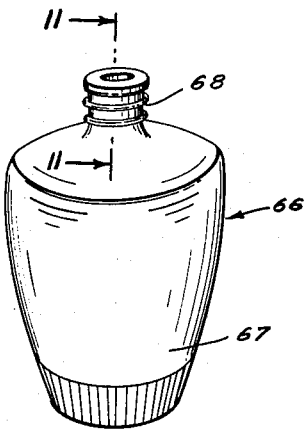
FIG.9
FIG.10
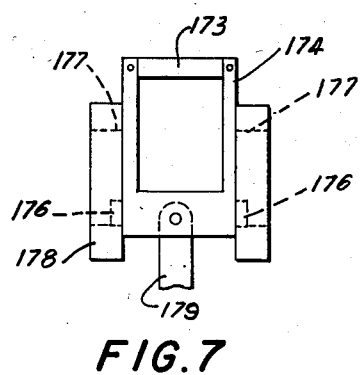
FIG.7
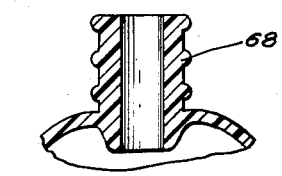
FIG.11
INVENTORS.
KENNETH M. LEGHORN
BY JACK B. MEISTER
AGENT

United States Patent Office 2,928,120
Patented Mar. 15, 1960

2,928,120

PROCESS AND APPARATUS FOR THE MANUFACTURE OF HOLLOW ARTICLES

Kenneth M. Leghorn, Berkeley Heights, and Jack B. Meister, Morris Plains, N.J., assignors, by mesne assignments, to American Can Company, New York, N.Y., a corporation of New Jersey Application December 20, 1955, Serial No. 554,362

7 Claims. (Cl. 18—5)

This invention pertains to methods and apparatus for molding hollow containers and more particularly to methods and apparatus for extruding predetermined lengths of plastic tubing between sequentially arranged pairs of separable mold sections, closing the mold sections about the tubing and expanding the tubing to a final desired configuration by applying fluid pressure to the interior of the tubing.

Plastic containers, more especially those of a type having relatively thin, flexible or resilient wall surfaces, are useful in the packaging of various fluid, semi-fluid or powdered materials commonly used in the cosmetic, pharmaceutical, food and allied fields. Materials packaged in such containers may be readily dispensed by applying manual pressure to the containers to partially collapse the same thereby decreasing the volume of the containers and ejecting the contents. Such containers are known to the prior art but the methods and apparatus for producing them suffer from many defiiciencies and the articles made thereby are defective in several respects.

It is known that containers of the general type herein contemplated may be formed by injecting a bubble of semi-fluid plastic material into a mold and then applying fluid pressure to expand the bubble into contact with the interior of the mold. Such a procedure necessarily is cumbersome in that it requires that an extruder head, having a hollow core through which fluid pressure is admitted to the mold, be in engagement with the mold during the mold filling and fluid pressure application operations. This, of course, necessitates the provision of one extruder for each mold and results in either a low rate of production of molded containers or in a requirement for a large number of extruders. The latter alternative is undesirable because of the large amount of equipment and hence inordinate capital outlay necessary for a substantial rate of production of molded containers. Such a procedure is disclosed in U.S. Patent Numbers 2,175,054; 2,230,190; 2,260,750; 2,597,558 and Re. 23,564.

Similarly, it is known to the prior art to extrude an open-ended tube between open mold parts and to close the molds and expand the tube. Such prior art attempts have, however, been limited to the expansion of the tube by admitting pressurized fluid at the top of the molds through a hollow core of the extruder. U.S. Patent No. 2,632,202 discloses such a procedure. As in the case of the extruded bubble, this procedure also necessitates the provision of one extruder head for each molded article throughout the expansion period. Neither of the above two processes permits the formation of a mechanically pressure-molded neck substantially simultaneously with the expansion of the molded article.

It is also known to the prior art to produce hollow plastic containers from a continuous length of extruded plastic tubing by leading the tubing between sequentially spaced mold sections positioned upon a rotatable table. In the latter arrangement, an extruder may be positioned approximately tangentially in respect to a circular table having the mold sections arranged on the periphery thereof. The extruded tubing may be continuously fed between the mold sections in a path parallel to that of the mold sections at the tangent positions. In such an operation, the mold sections may be closed about the tubing to pinch off both ends of the tubing to seal the same. Consequently, in order to apply fluid pressure to the interior of the tubing, it is necessary to puncture the tubing, as with a needle. The latter step requires the provision of additional apparatus, and in addition, the punctured portion of the tubing must be trimmed from the final container, a step which requires additional time and results in increased scrap material. U.S. Patent No. 2,579,390 discloses such a procedure.

It is further known to the prior art that hollow plastic articles may be made by first forming a parison, or preform, from plasticized material and then transferring the parison to one or more sets of finishing molds wherein the parison may be expanded to the final shape by applying additional internal fluid pressure. This procedure is undesirable in some respects, for example, it necessitates the provision of additional apparatus to accomplish the steps of transferring the parison and subsequently forming the same to a desired configuration. This procedure is disclosed in U.S. Patent No. 2,715,751.

When using flexible-walled plastic containers for the dispensing of the contents thereof in the form of a fine mist or spray, it is customary to insert in the bore of the container neck a plug having a small orifice through which the contents of the container are ejected in the desired particulate form upon the application of manual pressure to the container. The use of such a plug dictates that the bore of the container neck have substantially uniform dimensions with no irregularities which would prevent the ready insertion of the plug or which would allow the contents of the container to escape about the plug when pressure is applied to the container. At the present time such uniform bores are obtainable only by reaming the neck of the container to the desired dimensions. This operation constitutes an added time- and expense-consuming factor and, in addition, often results in residual chips of plastic material being left within the container which, upon an attempt to dispense the contents thereof, often lodge in the plug orifice and thereby prevent ejection of the contents of the container.

Therefore, it is an object of the present invention to provide a method of producing hollow plastic articles at a high rate of speed with a minimum of apparatus requirement.

It is a further object of the invention to provide methods and apparatus for producing hollow plastic containers having neck portions with accurately predetermined bore dimensions.

It is still another object of this invention to provide methods and apparatus for producing hollow plastic containers with a minimum amount of scrap material.

In accordance with the foregoing objects, the present invention provides a method of producing hollow plastic articles wherein predetermined lengths of extruded plastic tubing are gravity-fed between one or more pairs of separable mold halves or sections and over an upwardly projecting fluid pressure nozzle. Upon closing the mold sections, the upper extremity of each length of tubing is pinched together to form an hermetic seal whereupon fluid pressure is admitted through the nozzle to expand the tubing into conformity with the internal surfaces of the closed mold sections.

A preferred embodiment of the apparatus of the present invention comprises an indexable base or table having mounted thereon a number of pairs of separable mold sections. A plastics extruder is mounted above the table whereby a predetermined length of heat softened plastic tubing may be extruded downwardly between the mold sections until the lower extremity of the tubing is positioned over a blowing nozzle extending upwardly from the table between the mold sections. Means are provided to close the mold sections about the tubing and the nozzle and to cut the upper extremity of the tubing away from the extruder whereupon the table may be indexed to move the closed mold sections away from the extruder and to simultaneously position another pair of separated mold sections beneath the extruder for filling. Means are provided for then mechanically compressing a lower portion of the plastic tubing between the nozzle and a neck cavity portion of the mold sections thereby pressure molding an annular neck having an accurately and uniformly dimensioned bore as a result of the compression of the tubing between the nozzle and the mold walls.

In the preferred form shown this compression is brought about by means of an enlarged portion of the nozzle which is forcibly raised into the neck cavity portion after the mold sections are closed. It will be readily appreciated, however, that other ways of achieving this result could be employed. Therefore, in order to express this concept inclusively without regard for the particular means employed, we have adopted the expression "exerting by means of the mandrel radial outward mechanical pressure against the portion of the plastic tubing within the neck portion of the mold cavity" as a generic expression for all of such ways of causing this outwardly-forcing neck molding action including the preferred form shown, and the same will be used in this sense hereinafter.

The objects and provisions of the present invention will be more thoroughly understood by reference to the accompanying drawings wherein:

Fig. 6 is a top plan view, taken along line 6—6 of Fig. 4, and shows an apparatus for severing a lower portion of the plastic tubing which projects beneath the under surface of the closed mold sections;

Fig. 7 is a top plan view of apparatus for severing the extruded tubing from the extruder;

Fig. 8 is a cross-sectional view taken along line 8—8 of Fig. 2 and shows a valve mechanism for controlling the fluid pressure supply to the blowing nozzles;

Fig. 9 is a perspective view of a portion of one form of a mold section;

Fig. 10 is a perspective view of a container produced by the method and apparatus of the invention, and Fig. 11 is a cross-sectional view taken along line 11—11 of Fig. 10 and shows the uniform nature of the neck bore of a container produced in accordance with the present invention.

Figure 3:
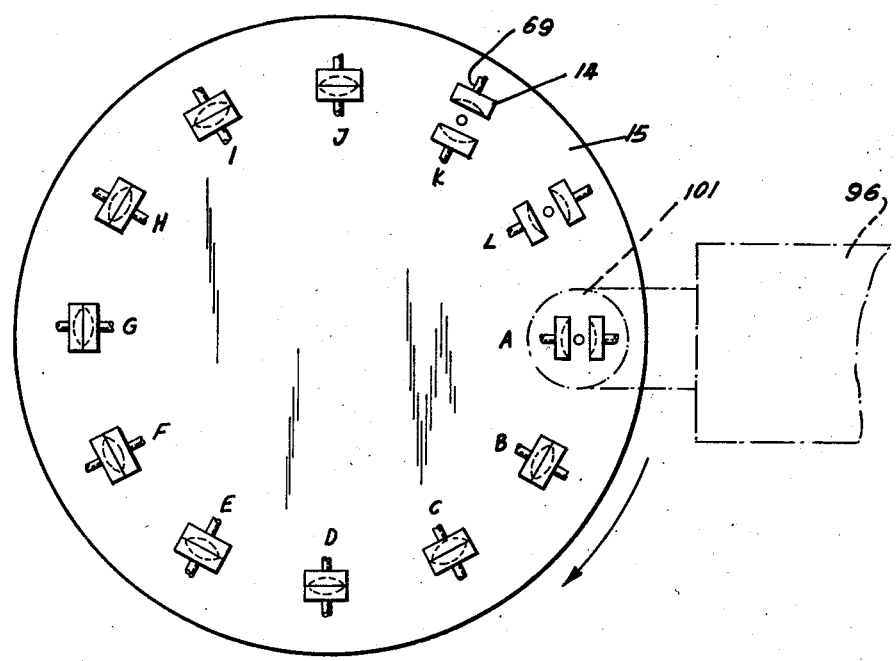
Fig. 3 is a top plan view of the indexable table showing one arrangement of the separable mold sections in both open and closed positions.

Referring now to the drawings, Fig. 3 shows one embodiment of the present invention wherein a number of separable mold sections 14 are mounted in a circular pattern upon the upper surface of a horizontally rotatable, circular, indexable base or table 15. In the particular embodiment illustrated in Fig. 3, twelve pairs of mold sections 14 are provided, the positions of the mold sections being designated by the letters A through L. At the start of the molding operation, some of the molds are preferably in closed positions and others in open positions. In the arrangement of Fig. 3, nine pairs of mold sections, i.e., those in positions B through J, are closed and three, i.e., K, L, and A are open.

*Table indexing mechanism*

Figure 1:
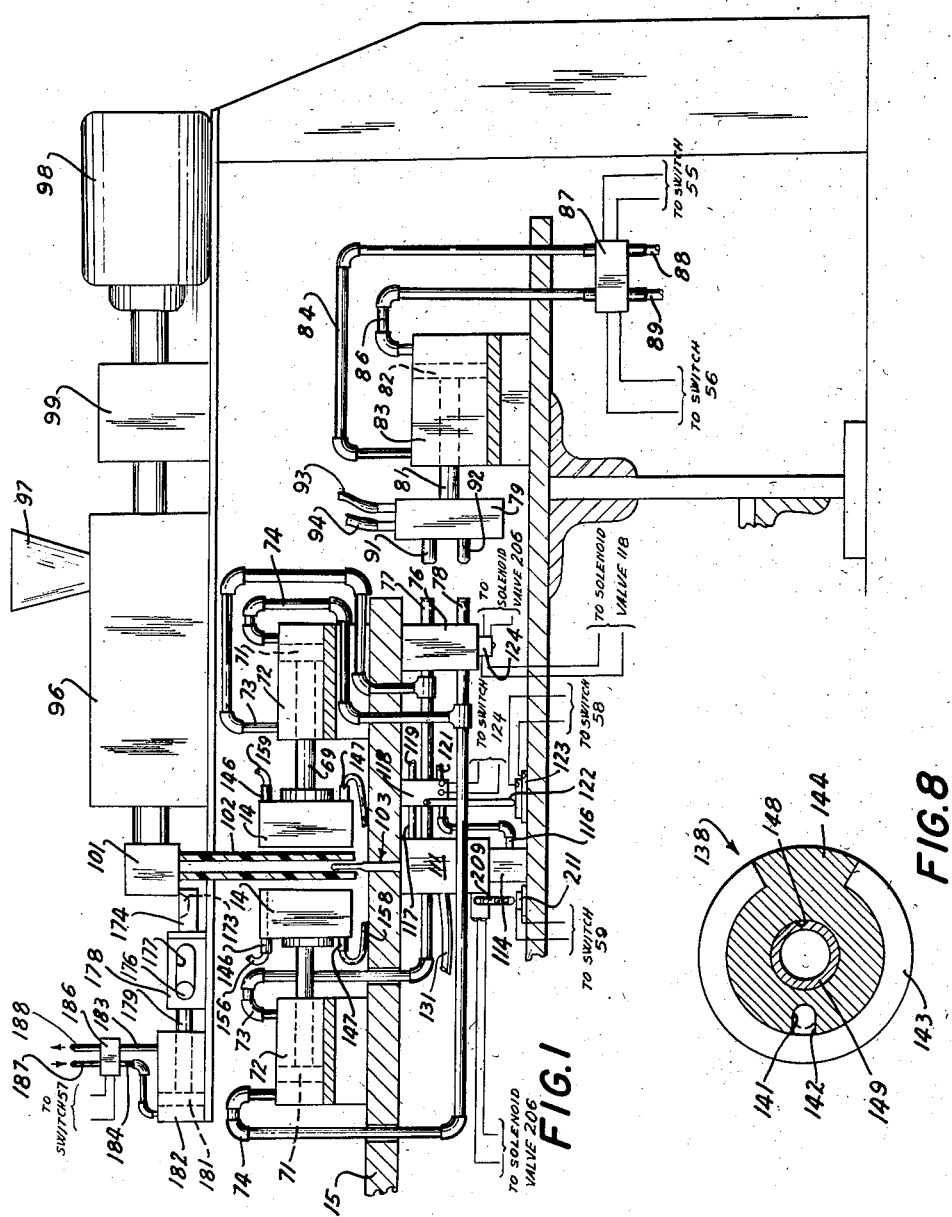
Fig. 1 is a partially schematic elevation, partly in cross-section, of a portion of one embodiment of the present invention and shows a length of plastic tubing being extruded between a pair of separated mold sections.
Figure 2:
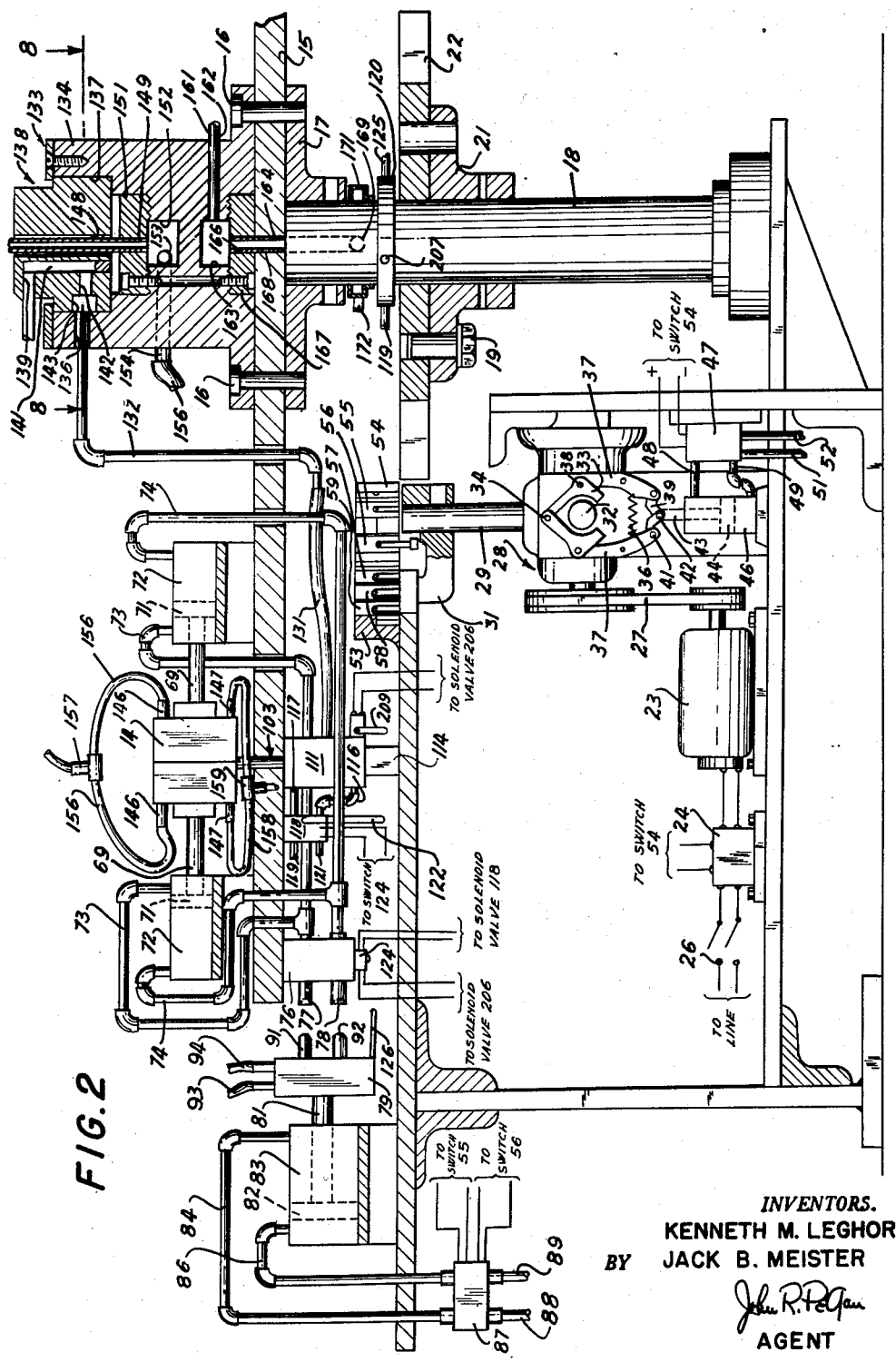
Fig. 2 is a view similar to Fig. 1 and, in another portion of the embodiment illustrated in Fig. 1, shows an indexable table having mounted thereon a pair of mold sections in the closed position.

Referring now to Figs. 1 and 2, the indexable table 15 is supported, as by bolts 16 and a collar 17 upon a rotatable vertical shaft 18 to which is secured, as by bolts 19 and a collar 21, an indexing Geneva gear 22. A table drive motor 23, controlled by a timer 24 and a starting line switch 26, is connected, as by a drive belt 27, through a gear reduction mechanism generally denoted as 28 to an upright, rotatable drive shaft 29 having an indexing arm 31 secured to the upper end thereof for indexing engagement with the Geneva gear 22.

The gear reduction mechanism includes a horizontally extending shaft 32 having a pair of brake shoes 33 mounted thereabout on a pivot 34. The brake shoes 33 are normally held in an open position by means of a biasing spring 36 and a pair of lever arms 37, the latter being connected to the brake shoes 33 by pivot pins 38. One extremity of a camming lever 39 is attached, by means of a pin 41, to the lower extremity of each of the lever arms 37. The other extremities of the camming levers 39 are connected by a pin 42 to a rod 43 of a piston 44 operating in a double-acting fluid pressure cylinder 46. A solenoid valve 47 is provided whereby fluid pressure may be admitted to or exhausted from the cylinder 46 through pipes 48 and 49. Fluid may be admitted to or exhausted from the solenoid valve 47 through pipes 51 and 52. Thus actuation of the solenoid valve 47 to admit fluid through pipe 48 to the cylinder 46 operates to close the brake shoes 33 about the shaft 32 thereby quickly stopping the table drive motor 23 and bringing the indexing arm 31 to a sudden stop. Alternatively, the brake shoes 32 could be operated magnetically, as by making the rod 43 the core of an electrically actuable solenoid.

A switch mounting support 53 in the form of an annular segment having an internal curvature approximately equal to the diameter of the circle swept out by the outer extremity of the indexing arm 31 is mounted about the drive shaft 29 and carries thereon a number of switches 54, 55, 56, 57, 58 and 59 for sequential actuation by the indexing arm 31, as hereinafter described.

*Molds and mold actuation mechanism*

Figure 12:
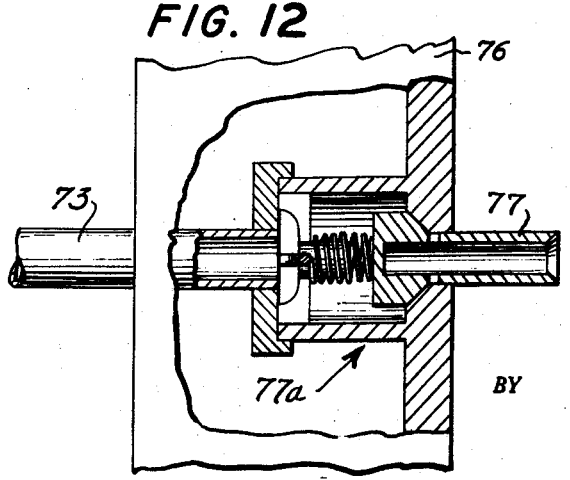
Fig. 12 is an enlarged detail, partly in section showing a check valve as used with the fluid pressure mechanism for operating the mold parts.

Each mold section 14 is provided, adjacent the upper surface thereof, with a sealing edge 61 (Fig. 4) and has an inverted mold cavity generally denoted as 62, having a body cavity portion 63 and neck cavity portion 64 (Figs. 4 and 9) designed for the formation of a container generally denoted as 66 (Fig. 10) and having a body portion 67 and a threaded neck portion 68. Each mold section 14 is mounted upon one extremity of a piston rod 69 having a piston 71 secured to the other extremity thereof, the latter being slidable in a double-acting fluid pressure cylinder 72. Each cylinder 72 is provided with fluid pressure lines 73 and 74 which are connected to a stationary fluid pressure head 76 depending from an under surface of the indexable table 15 near the periphery thereof. One such stationary head 76 is provided for each pair of mold sections 14. The fluid pressure lines 73 and 74 can serve alternatively as either fluid pressure supply lines or as fluid pressure exhaust lines. Each stationary head 76 is provided with projecting upper and lower socket members 77 and 78 respectively, one for each of the fluid pressure lines 73 and 74. Each of the sockets 77 and 78 is provided with a check valve like the one shown at 77a in Fig. 12 for socket 77 to prevent escape of pressurized fluid from the fluid pressure lines 73 and 74. Fluid pressure may be supplied intermittently through the lines 73 and 74 to the cylinders 72 to open or to close the mold sections 14 by means of a reciprocable fluid pressure head 79 which is mounted upon one extremity of a piston rod 81, the latter bearing a piston 82 upon the other extremity thereof, the piston 82 being slidable in a double-acting fluid pressure cylinder 83. The fluid pressure supply to and exhaust from the cylinders 83 is through lines 84 and 86, each pair of which is connected to a solenoid valve 87, the latter being provided with fluid pressure supply and exhaust lines 88 and 89.

Each reciprocable head 79 is provided with an upper and a lower fluid pressure nozzle 91 and 92 respectively. The nozzles 91 and 92 have tapered extremities for co-operation with the corerspondingly shaped sockets 77 and 78 in the stationary heads 76. Two reciprocable fluid pressure heads 79 are provided, one being located in position A (Fig. 3) to close the mold sections 14 in that position, and the other being located in position J (Fig. 3) to open the mold sections 14 in that position. In the case of the reciprocable head which serves to close the mold sections (Fig. 1), the lower nozzle 92 is maintained under continuous pressure through a fluid pressure supply line 93 and is provided with a check valve of the same sort as illustrated at 77a for socket 77 which normally prevents escape of the pressurized fluid. In this case the upper nozzle 91 serves as an exhaust and for this purpose is connected to an exhaust line 94. In the case of the reciprocable fluid pressure head which serves to open the molds (Fig. 2), the upper nozzle 91 is connected to the fluid pressure supply line 93 and the lower nozzle 92 is connected to the exhaust line 94. When the nozzles 91 and 92 engage the sockets 77 and 78, the check valves are actuated to allow fluid pressure to be admitted to or exhausted from the fluid pressure lines 73 and 74.

*Tubing extrusion and blowing mechanism*

A plastics extruder 96, having a feed hopper 97, is mounted above the table 15 and is driven by an extruder drive motor 98 through a gear reduction box 99. The extruder 96 is provided with an extruder head 101 which is located above the table 15 at position A and vertically spaced above and alignable with the mold sections 14. Thus a length of tubing of plastic material 102 (Fig. 1), such as polyethylene, may be fed downwardly from the extruder head 101 between the open mold sections 14.

Figure 4:
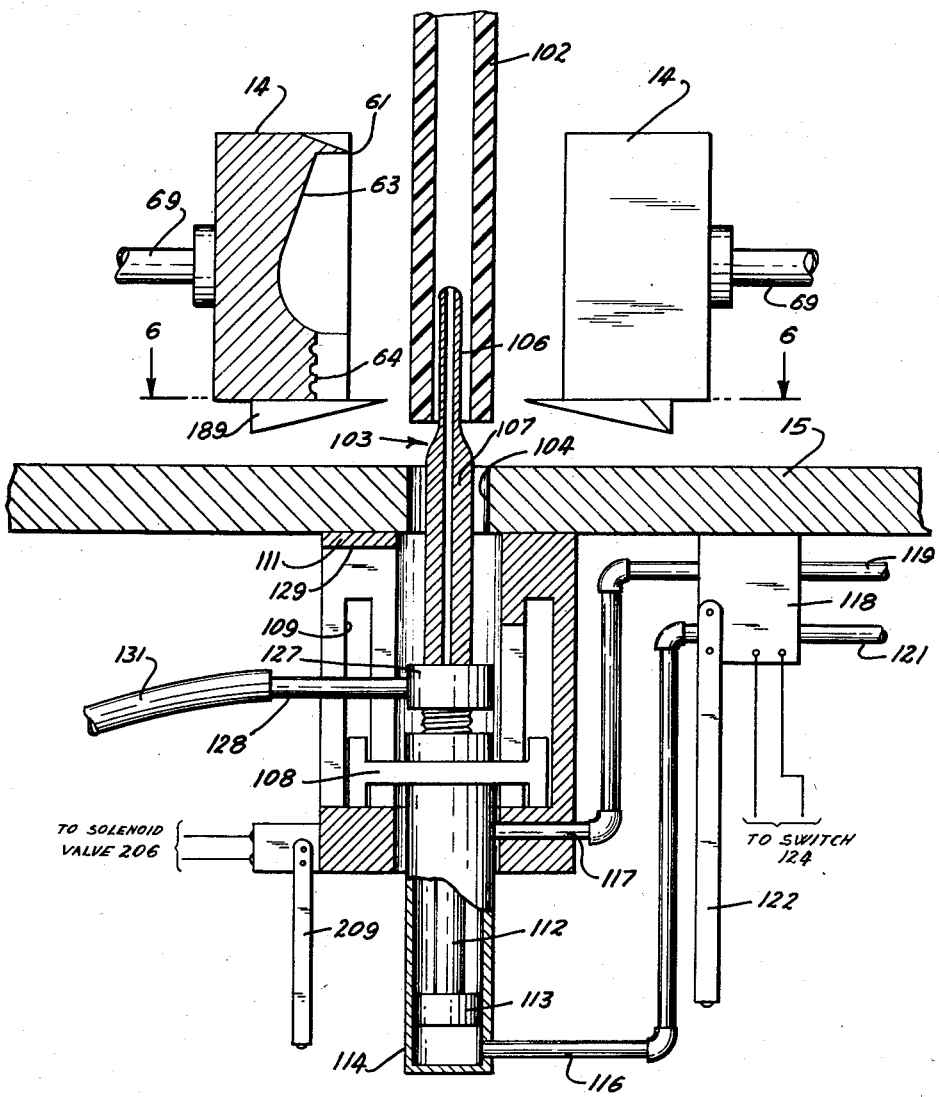
Fig. 4 is a front elevational view, partly in cross-section, of a pair of separated mold sections and shows the fluid pressure nozzle in a retracted position.
Figure 5:
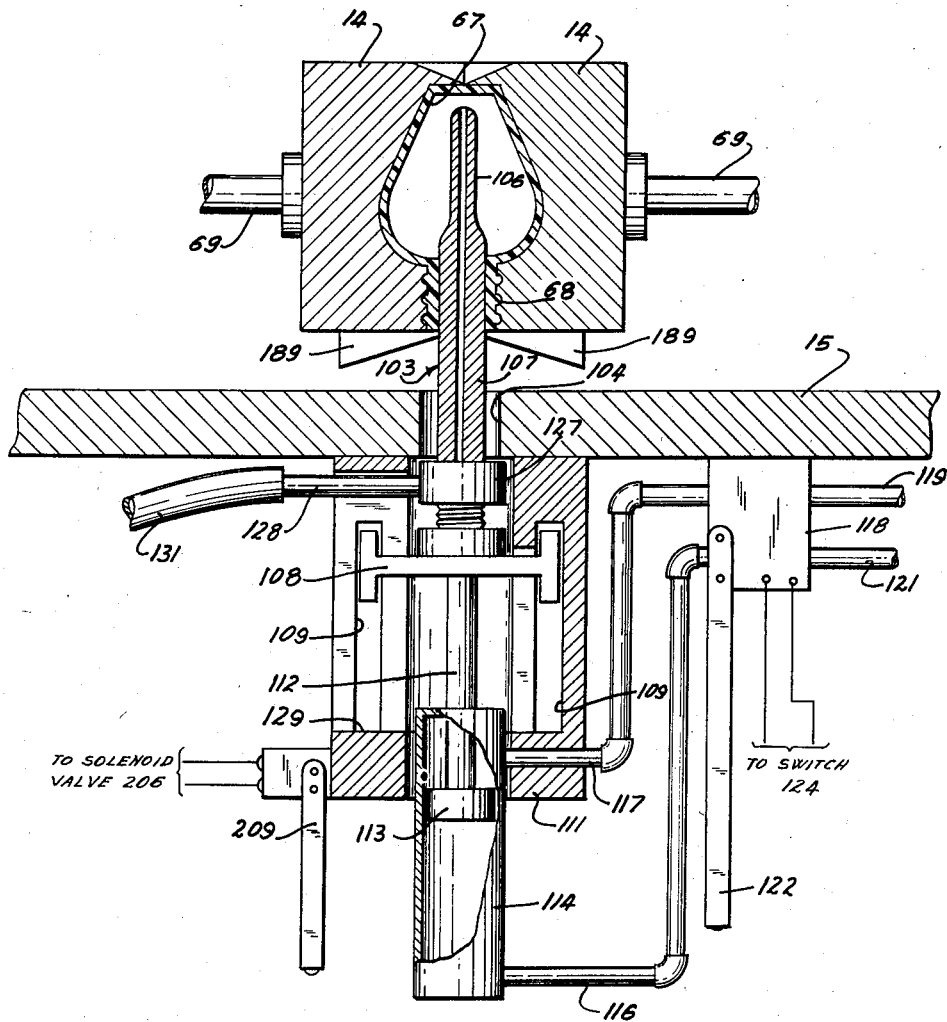
Fig. 5 is a view similar to Fig. 4 and shows the mold sections in a closed position and the fluid pressure nozzle in an elevated position.

A blowing nozzle, generally denoted as 103, is mounted upon the table 15 below each pair of mold sections and extends upwardly through a corresponding aperture 104 (Figs. 4 and 5) in the table 15 along the vertical centerline of the closed mold sections. Figs. 4 and 5 illustrate a blowing nozzle 103 which is provided with an upper, slender pilot portion 106 which may be tapered by a smoothly contoured transition surface into a mandrel or neck core portion 107 of a relatively larger, predetermined diameter. Each blowing nozzle 103 is mounted upon a slide member 108 which is vertically slidable in grooves 109 in a rack 111. The slide member 108 is connected to one extremity of a piston rod 112, to the other end of which is attached a piston 113 which is slidable in a double-acting fluid pressure cylinder 114. Pressurized fluid is supplied to and exhausted from each of the cylinders 114 through fluid pressure lines 116 and 117 which are connected to a solenoid valve 118, each of the latter being provided with a fluid pressure supply line 119 and an exhaust line 121. Supply lines 119 are connected to an annular fluid pressurized slip ring 120 (Fig. 2) mounted about the shaft 18. Pressurized fluid is admitted to ring 120 through a header 125. Air is discharged from the valves 118 through exhaust lines 121 directly to the atmosphere. Thus, operation of cylinders 114 serves to elevate or retract the nozzles 103.

Operation of cylinders 114 is accomplished by actuating the solenoid valves 118. Each solenoid valve 118 has a first electrical contact member 122 depending therefrom. A first contact plate 123 is mounted below the indexable table 15 at position A (Fig. 1). When the table is indexed to advance a pair of open mold sections 14 into position A beneath the extruder head 101, the first electrical contact member 122 attached to the corresponding solenoid valve 118 establishes electrical contact with the first contact plate 123. First contact plate 123 is connected to switch 58 and actuation of this switch, as hereinafter described, serves to operate the solenoid valve 118 and the cylinder 114 to elevate the blowing nozzle 103 at position A below the extruder head 101.

Each of the stationary fluid pressure heads 76 has attached thereto a microswitch 124 which is actuated by an arm 126 (Fig. 2) attached to the reciprocable fluid pressure head 79 in position J. Actuation of microswitch 124, which is connected to solenoid valve 118, serves to operate the solenoid valve 118 to retract the corresponding blowing nozzle 103 in position J.

Each blowing nozzle 103 is provided with a fluid pressure supply box 127 to which is connected a fluid pressure supply nipple 128. The rack 111 is cut away as at 129 to allow for vertical movement of the nipple 128. Fluid pressure, preferably pneumatic pressure, is supplied through the nipples 128 to the blowing nozzles 103 through flexible supply lines 131 and rigid lines 132 which extend from a fluid pressure chamber generally denoted by the numeral 133 (Fig. 2) and located centrally of the upper surface of the indexable table 15. The chamber 133 comprises an outer shell 134 which is rigidly secured to the table 15 as by bolts 16 and is provided with spaced orifices 136 equal in number to the number of blowing nozzles 103. The orifices 136 communicate with a well 137 formed in the shell 134 in which is rotatably mounted a valve member generally denoted as 138 (Fig. 8) having a fluid pressure inlet 139, a vertical passage 141 and a horizontal passage 142. The passage 142 interconnects with a peripheral slot 143 extending partially about the circumference of the valve member 138 for registration with a number of the orifices 136 upon relative movement between the outer shell 134 and the valve member 138. Thus, an unslotted peripheral portion 144 of the valve member 138 serves to block some of the orifices 136 and hence to cut off the fluid pressure supply to the corresponding blowing nozzles 103 in predetermined positions of the indexable table 15.

It is frequently desired to cool the mold sections 14 during the operation of the apparatus of this invention. Therefore, the mold sections 14 are provided with internal cooling chambers (not shown) and with cooling fluid inlet and outlet connections 146 and 147 respectively. The valve member 138 is provided with a centrally extending passage 148 in which is mounted a cooling fluid inlet connection 149 which, in the assembled position of the fluid pressure chamber, extends through an apertured gasket 151 and registers with an inlet chamber 152 for the cooling fluid, which inlet chamber is also formed in the outer shell 134. A passage 153 is formed in the outer shell 134 to interconnect with the inlet chamber 152 and is threaded for reception of a cooling fluid supply pipe 154, which pipe is connected to the mold sections 14 by means of flexible tubing 156 having a T connection 157. The cooling fluid is discharged from the outlets 147, through a flexible tubing 158, having a T connection 159, to a cooling fluid outlet connection 161 which extends through an aperture 162 in the outer shell 134 and interconnects with an outlet chamber 163 also formed in the outer shell 134. The cooling fluid then may be conducted through an outlet pipe 164, which pipe extends through an aperture 166 in a gasket 167 and an aperture 168 in the table 15 into the interior of the vertical shaft 18, where it connects, through a passageway 169, with the interior of a hollow slip ring 171 from which the cooling fluid may be discharged by means of a discharge pipe 172.

Tube cutting mechanism

In Figs. 1 and 7 there is illustrated an upper, double-bladed knife 173 adjacent the under surface of the extruder head 101 and mounted upon a U-shaped slide 174, the latter being provided with guide pins 176 for sliding engagement with slots 177 in a mounting member 178. The slide 174 is secured to one extremity of a piston rod 179 which bears on the other extremity thereof a piston 181 which is slidable in a double-acting fluid pressure cylinder 182. Pressurized fluid may be supplied to and exhausted from the cylinder 182 through fluid pressure lines 183 and 184 which are connected to a solenoid valve 186 having fluid pressure supply and exhaust lines 187 and 188. Thus reciprocation of the upper knife blade 173 serves to sever the extruded tubing 102 from the extruder head thereby leaving an open-ended portion of the tubing 102 attached to the extruder head 101 and permitting the mold sections 14 which are positioned underneath the extruder head to be indexed to another position and freeing the extruder head for extrusion between another set of mold sections.

As will be noticed by reference to Fig. 4, the extruded tubing in its lowermost position may extend a short distance beyond the lower surfaces of the mold sections 14. This excess plastic material may be trimmed from the finished article. Fig. 6 illustrates an apparatus whereby this operation may be accomplished. There is provided a pair of lower knife blades 189 having, in the cutting edges thereof, semi-circular indentations 191. The lower knife blades 189 are secured to L-shaped arms 192 having one pair of extremities thereof movably secured together by a fixed pivot pin 193. The other extremity of each arm 192 is pivoted, as by pins 194 to one extremity of a camming arm 196. The other extremities of the camming arms 196 are pivotally secured to each other and to a lug 197 which is mounted upon one extremity of a piston rod 199 having secured to the other extremity thereof a piston 201 which is slidable in a double-acting fluid pressure cylinder 202. The cylinder 202 is provided with fluid pressure supply and exhaust lines 203 and 204 which are connected to a solenoid valve 206, the latter being connected to a fluid pressure line 207 and an exhaust line 208. The supply line 207 to each of the solenoid valves 206 is connected to the fluid pressure slip ring 120 and pressurized fluid is discharged from the valves 206 through exhaust lines 208 to the atmosphere. The lower knife blades 189 are mounted on the indexable table 15 below the mold sections 14 and immediately adjacent thereto in such a manner that operation of the cylinders 202 serves to open or close the lower knife blades 189. When the blades 189 are in a closed position, the edges of the indentations 191 are closed about the enlarged mandrel portion 107 of the elevated blowing nozzle 103 thereby compressing a narrow annulus of plastic material between the mandrel and the knife edges to a thin, flask-like condition whereby any tubing which projects beneath the knife blades 189 may be readily removed from the molded container. The mandrel 107 and the cooperating knife blades 189 may be designed to completely sever a portion of the tubing 102 which projects from the closed mold sections 14. For example, the mandrel portion 107 of the nozzle 103 may be provided with an annular groove (not shown) for cooperation with the blades 189, the plastic being forced into such a groove by the blades and thereby severed. If this procedure is followed, the stroke of the reciprocable nozzle 103 should be sufficient to retract the nozzle below the upper surface of the table 15 in order that the severed portion of the tubing 102 may be removed.

There is mounted on each of the racks 111 a second electrical contact member 209 (Figs. 1 and 4) which, in position A (Fig. 1), establishes electrical contact with a second contact plate 211 mounted beneath the indexable table 15 in position A. The second contact plate 211 is connected to switch 59 and when the latter switch is actuated, as hereinafter described, solenoid valve 206 is operated to effect the closure of lower knife blades 189 in position A. Solenoid valves 206 are also connected to microswitches 124 whereby, when the microswitches 124 in position J are actuated by the arm 126, the solenoid valve 206 in position J operates to open the lower knife blades 189 in that position.

If it is desired to open the blades 189 and to retract the nozzles 103 in a position other than J, for example position K, this may be accomplished by providing, in place of arm 126, a stationary camming means (not shown) in such other position to actuate switch 124 thereby opening the blades 189 and retracting the corresponding nozzle 103.

Alternatively, if none of the tubing 102 projects below the mold sections 14, or if it is desired to remove the excess plastic from the molded container in a separate operation, the lower knife blades 189 and associated mechanism may be eliminated.

Operation

Figs. 1 and 4 illustrate open mold sections 14 in position A and Figs. 2 and 5 illustrate mold sections in the closed positions. Fig. 2 specifically illustrates the apparatus of the invention in the position denoted as J in Fig. 3. At position A, illustrated in Figs. 1 and 4, the open mold sections 14 are directly under the extruder head 101 for reception of the extruded tubing 102. In the positions of the molding apparatus illustrated in Fig. 3, the unslotted portion 144 of the valve member 138 in the fluid pressure supply chamber 133 is in a position to close the orifices 136 which lead to the blowing nozzles 103 in the positions denoted as K, L and A, i.e., the positions in which the molds are open. Consequently, no air is admitted to these nozzles.

At the beginning of the molding operation, the indexing arm 31 is in contact with switch 54 which is connected to the timer 24, the latter being connected to the table drive motor 23. When the timer 24 is started, as by closing the starting line switch 26, the timer keeps the table drive motor 23 shut off for a dwell period corresponding to the time required to extrude a predetermined length of tubing 102 to the desired position between the mold sections 14 in position A. At this time the blowing nozzle 103 in position A is in its lower or retracted position and the tubing 102 is extruded over the slender pilot portion 106 of the blowing nozzle 103, in position A, and, if desired, to a sufficient length to extend a short distance below the lower surfaces of the mold sections, as illustrated in Fig. 4.

At the end of the initial dwell period, the timer 24 starts the table drive motor to rotate the indexing arm 31 which then engages switch 55 which is connected to the two solenoid valves 87 which then operate the cylinders 83 to move the reciprocable pressure heads 79 so that the nozzles 91 and 92 thereon are engaged with the corresponding sockets 77 and 78 of the stationary fluid supply heads 76 in positions A and J (Fig. 3) whereby fluid pressure is admitted to the cylinders 72 in the positions A and J in such a manner that the mold sections 14 in position A are closed and those in position J are opened. The reciprocable fluid pressure head 79 in position J is provided, as previously indicated, with a projecting arm 126. When the nozzles 91 and 92 of this reciprocable head 79 are engaged with the corresponding sockets 77 and 78, the projecting arm 126 engages and actuates the microswitch 124 on the corresponding stationary pressure head 76 thereby retracting the blowing nozzle 103 and opening the lower knife blades 189 in position J. Closure of the mold sections in position A serves to pinch the extruded tubing between the edges 61 of the mold sections 14 and simultaneously to effect an hermetic seal of the plastic between these edges.

As the indexing arm 31 continues its rotation, it then encounters and actuates switch 56 which is also connected to solenoid valve 87, the latter being thereupon operated to retract the reciprocable fluid pressure heads 79 out of engagement with the sockets 77 and 78.

Upon further rotation of the indexing arm 31, the switch 57 is actuated. Switch 57 is connected to solenoid valve 186 hence actuation of switch 57 serves to operate cylinder 182 to reciprocate the upper knife blade 173, whereby the tubing 102 is severed from the extruder head 101, the upper knife blade 173 remaining in its extended position from which it is returned to its retracted position upon the next operation of the cylinder 182. The tubing 102 which remains attached to the extruder head 101 is provided with an open end by the severing action of the knife 173.

Continued rotation of the indexing arm 31 then actuates switch 58 which is connected, through the first contact plate 123 and the first contact member 122, to the solenoid valve 118 in position A, which, upon actuation of switch 58, operates to lift the corresponding blowing nozzle 103 into its uppermost position as illustrated in Fig. 5. In this position the transition surface and enlarged neck core portion 107 of the blowing nozzle 103 forms the neck portion 68 of the container 66 by mechanically squeezing the plastic against the adjacent surfaces 64 of the mold sections 14.

The continued rotation of the indexing arm 31 next engages and actuates switch 59 which is connected, through the second electrical contact member 209 and the second contact plate 211 to the solenoid valve 206, the latter being thereby operated to close the lower knife blades 189.

The indexing arm 31 then rotates into engagement with the Geneva gear 22 to index the table 15 in a clockwise direction (Fig. 3) thereby advancing each pair of mold sections 14 one position. Thus when the filled mold sections 14 which were formerly in position A advance into position B, air is admitted through the elevated nozzle 103 in position B thereby expanding the tubing 102 into contact with the internal walls of the body cavity portion 63 of the closed mold sections 14 to form a finished container 66 as illustrated in Fig. 10.

Air is admitted continuously through the blowing nozzles 103 in positions B through J while the mold sections 14 are closed and the plastic of the blown containers is in the process of solidifying and curing.

The rotating arm 31 next re-engages switch 54 to actuate the timer 24 to shut off the table drive motor 23. Simultaneously, actuation of switch 54, which is also connected to the solenoid valve 47, effects the closure of brake shoes 33 about the horizontal shaft 32 to stop the rotation of the table drive motor 23 thereby bringing the indexing arm 31 to a sudden stop. After the dwell period, during which the tubing 102 is extruded between the mold sections now in position A, the timer 24 again starts the table drive motor 23 and the rotating indexing arm 31 actuates switches 55, 56, 57, 58 and 59 in another cycle.

A finished container 66, as produced by the apparatus and method of the invention, is illustrated in perspective in Fig. 10.

Fig. 11 shows, in cross-section, the molded neck portion 68 of the container 66 as produced by this invention. It will be observed that the bore of the molded neck is completely uniform and of relatively great thickness as compared to that of the walls of the container.

In forming plastic containers in accordance with the present invention, the nature of the plastic material, the diameter and the wall thickness, of the extruded tubing, the shape of the final container, the desired container wall thickness, and the blowing air pressure are factors of importance which must be considered.

As an example of a specific container produced in accordance with the present invention, the container illustrated in Fig. 10 is formed of polyethylene and has an oblong horizontal cross-sectional configuration, wherein the maximum minor axis has a length of approximately 1.375 inches and the maximum major axis has a length of about 2.596 inches. The container has an over-all height, including the molded neck, of about 4.453 inches. The average side wall thickness is from about 0.035 inch to about 0.048 inch. In molding a container with such a configuration, it has been found that the extruder head should be provided with a core having an oblong cross-sectional shape. For example in molding the container of Fig. 10, an oblong core was used having a minor axial length of about 3/16 inch and a major axial length of about 1/4 inch. Tubing having an outside diameter of about 0.650 inch and extruded about such a core had a bore of oblong cross-section whereby the tubing wall thickness was greater in the direction of the minor axis of the oval bore than it was in the direction of the major axis of the bore. A tubing with such a non-uniform wall thickness, when expanded into the final ovoid form, results in a container having side walls of approximately uniform thickness. It has been found that a blowing air pressure from about five to about ten pounds per square inch is desirable in forming a container of the foregoing characteristics. In this case, the enlarged portion 107 of the blowing nozzles 103 had an outside diameter of about 3/8 inch whereby the bore of the neck of the container was provided with a uniform 3/8 inch internal diameter.

In producing a uniform molded neck in accordance with the present invention, the blowing nozzles 103 should be elevated to a height such that the upper extremities of the enlarged portions 107 thereof project beyond the junction of the neck and the side walls of the container. If the enlarged portions 107 are elevated to an insufficient height, the semi-fluid plastic material will fill in about the tapered portions or the slender portions 106 of the nozzles and result in an inwardly extending shoulder of plastic material at the junction of the neck and the sidewalls of the container.

The particular apparatus described herein and illustrated in the accompanying drawings is merely illustrative of the principles of the present invention and is not to be construed as limiting the scope thereof. For example, in the case of a horizontally rotatable indexable table as described and shown herein, a separate electrical timing system may be provided in place of the switches 54 through 59, in order to accomplish the proper sequence of operating steps. Further, there could be provided, instead of the horizontally rotatable indexable table, a vertically rotatable table having the mold sections mounted upon the periphery thereof and the tubing extruded downwardly therebetween at the topmost position of the molds. Alternatively, there could be provided a reciprocable table having two or more pairs of mold sections thereon and capable of reciprocation into and out of registration with the extruder head. Also, preformed tubing, in a heat-softened condition, could be positioned between the open mold sections and the container then molded as described hereinabove.

The upper knife blade 173 and the associated mechanism may, if desired, be eliminated. Thus, it has been discovered that, in the case of hot, extruded polyethylene tubing, the tubing may be cleanly severed from the extruder head by effecting a sharp lateral pull on the tubing, as by moving the closed mold sections suddenly from under the extruder head.

If desired, the finished container 67 may be ejected from the open mold sections 14 by a sudden application of high pressure air through the blowing nozzles 103 in position J.

It is to be understood that various other modifications

What is claimed is:

1. The method of producing hollow, ridged-necked articles comprising extruding an open-ended length of softened expandable plastic tubing with one end arranged about the extreme end of a hollow blowing mandrel having a reduced diameter pilot section at said extreme end and a larger core section spaced from said end, said tubing being extruded with a diameter to fit loosely around the pilot section of the mandrel and also of a diameter and thickness to be only compressively fittable between said mold neck portion and the core section of said mandrel, closing the mold about the length of tubing and the mandrel pilot section and pinching the end of the tubing length remote from the mandrel to seal the same, thereafter shifting said mandrel axially to force the core section thereof into the neck portion of the mold to compress the adjacent plastic tubing portions and force them radially outwardly into the ridge-forming grooves of the neck portion of the cavity to fill the same, applying fluid pressure through the hollow mandrel to expand the tubing into contact with the mold cavity, and causing the tubing to set in its compressed and expanded condition.

2. Apparatus for molding hollow containers comprising a pair of separable mold sections having mold cavities provided with cooperating neck-forming portions, a blowing nozzle movably mounted adjacent the neck-forming portions of the mold section cavities, said nozzle having a reduced pilot end section and an enlarged neck core section connected by a smoothly contoured transition surface, means to position a length of plastic tubing between the separated mold sections and over the reduced pilot section, means to close the mold sections about the tubing and to hermetically seal an extremity of the enclosed tubing remote from said neck-forming portions, means to advance the nozzle after closing of the mold sections so as to force first the transition surface and then the neck core section thereof into the other extremity of the tubing to mold the container neck by compressing a portion of the tubing between the neck core section and the neck-forming portions of the mold cavities, and means to admit pressurized fluid to the advanced nozzle to expand the plastic tubing into contact with the walls of the mold cavities.

3. An apparatus for molding hollow plastic containers comprising an indexable table, a plurality of pairs of separable mold sections mounted on the table, each of said mold sections being provided with a mold cavity wherein a neck-forming portion thereof is in an inverted position adjacent the table and each pair being closable to form a container mold, a blowing nozzle movably mounted on said table below each pair of mold sections, said nozzle having a reduced upper pilot section and an enlarged lower neck core section connected by a smoothly contoured transition surface and being reciprocable within the neck portion of the corresponding mold, an extruder mounted above the indexable table and the mold sections in alignment with one index position of the mold sections whereby a predetermined length of plastic tubing may be extruded downwardly between each pair of separated mold sections in turn and over the reduced portion of the corresponding nozzle, means to close each separated pair of mold sections about a portion of the extruded tubing and hold it closed throughout a predetermined number of index positions and to form an hermetic seal at an upper extremity of the enclosed tubing, means to sever the unenclosed tubing from the extruder, means to raise the corresponding nozzle to advance the transition surface and neck core section thereof into the enclosed tubing and to pressure mold a neck by compressing a portion of the tubing between the neck core section and the neck-forming portions of the mold cavities, means to supply pressurized fluid to the nozzle whereby a portion of the enclosed tubing is expanded into conformity with the corresponding mold cavity, means to index the table in steps timed to the completion of a mold filling and closing operation at each pair of mold sections, means to open each pair of mold sections as it approaches the index position adjacent the extruder for removal of the formed container, and means to retract the corresponding nozzle to its initial position to receive the next tube end.

4. The apparatus defined in claim 3 in which the mold sections are mounted for separating and closing movements essentially transverse to the direction of indexing travel.

5. The apparatus defined in claim 3 in which the means for closing the mold sections and holding them closed is a fluid pressure means, and which includes a local fluid pressure supply for supplying said fluid pressure means coacting with each mold closing mechanism at one indexed position only of the table, and in which said fluid pressure means includes a check device for trapping the fluid pressure and holding the mold closed throughout additional indexed positions even through disassociated from said fluid pressure supply.

6. An apparatus for molding hollow plastic containers comprising an indexable table, a plurality of pairs of separable mold sections mounted on the table, each of said mold sections being provided with a mold cavity wherein a neck forming portion thereof is in an inverted position adjacent the table and each pair being closable to form a container mold, a blowing nozzle mounted on said table below each pair of mold sections in position to enter the neck portion of the corresponding mold, an extruder mounted above the indexable table and the mold sections in alignment with one index position of the mold sections whereby a predetermined length of plastic tubing may be extruded downwardly between each pair of separated mold sections in turn and over a portion of the corresponding nozzle, fluid pressure means to close each separated pair of mold sections about a portion of the extruded tubing and hold it closed throughout a predetermined number of index positions and to form an hermetic seal at an upper extremity of the enclosed tubing, means to sever the unenclosed tubing from the extruder and means to supply pressurized fluid to the nozzle whereby a portion of the enclosed tubing is expanded into conformity with the corresponding mold cavity, means to index the table in steps timed to the completion of a mold filling and closing operation by each pair of mold sections, means to open each pair of mold sections as it approaches the index position adjacent the extruder for removal of the formed container, and a local fluid pressure supply for supplying said fluid pressure means and coacting with the fluid pressure means for each mold closing mechanism at one indexed position only of the table, and said fluid pressure means including a check device for trapping the fluid pressure and holding the mold closed throughout additional indexed positions even though disassociated from said fluid pressure supply.

7. The method of producing hollow, ridged-necked articles comprising extruding an open-ended length of softened expandable plastic tubing with one end arranged about a hollow blowing mandrel and of a diameter to fit loosely around the outer surface of the mandrel, closing the mold about the length of tubing and mandrel and pinching the end of the tubing length remote from the mandrel to seal the same, thereafter exerting by means of the mandrel radial outward mechanical pressure against the portion of the plastic tubing within the neck portion of the mold cavity to compress the adjacent plastic tubing portions and force them radially outwardly into the ridge-forming grooves of the neck portion of the cavity to fill the same, applying fluid pressure through the hollow mandrel to expand the tubing into contact with the mold cavity, and causing the tubing to set in its compressed and expanded condition.

References Cited in the file of this patent

UNITED STATES PATENTS

| | | |
|---|---|---|
| 1,428,855 | Miller | Sept. 12, 1922 |
| 2,359,216 | Hoffman et al. | Sept. 26, 1944 |
| 2,500,083 | MacConnell | Mar. 7, 1950 |
| 2,676,368 | Heiden et al. | Apr. 27, 1954 |
| 2,715,751 | Weber | Aug. 23, 1955 |
| 2,784,452 | Ruekberg et al. | Mar. 12, 1957 |
| 2,792,593 | Hardgrove | May 21, 1957 |

FOREIGN PATENTS

| | | |
|---|---|---|
| 1,029,586 | France | Mar. 11, 1953 |
| 697,326 | Great Britain | Sept. 23, 1953 |
| 713,419 | Great Britain | Aug. 11, 1954 |
| 163,661 | Australia | June 28, 1955 |
| 1,104,304 | France | June 8, 1955 |
| 1,105,529 | France | July 6, 1955 |